United States Patent [19]
Crandall et al.

[11] Patent Number: 5,963,641
[45] Date of Patent: Oct. 5, 1999

[54] DEVICE AND METHOD FOR EXAMINING, VERIFYING, CORRECTING AND APPROVING ELECTRONIC DOCUMENTS PRIOR TO PRINTING, TRANSMISSION OR RECORDING

[75] Inventors: Ronald Crandall, Irvine; Patrick Gerald Marchese, Santa Ana, both of Calif.

[73] Assignee: Markzware, Inc., Santa Ana, Calif.

[21] Appl. No.: 08/977,928

[22] Filed: Nov. 24, 1997

Related U.S. Application Data

[63] Continuation of application No. 08/526,554, Sep. 12, 1995, abandoned.

[51] Int. Cl.⁶ .................................. H04L 9/00; G09C 3/00
[52] U.S. Cl. .................... 380/2; 380/4; 380/9; 380/49; 380/50; 380/51; 380/55; 395/101; 395/113; 395/114
[58] Field of Search ................................ 380/2, 4, 23, 25, 380/49, 50, 59, 51, 55, 9; 395/101, 109, 113, 114

[56] References Cited

U.S. PATENT DOCUMENTS

| | | | |
|---|---|---|---|
| 4,849,883 | 7/1989 | Mitchell et al. | 395/101 |
| 5,347,578 | 9/1994 | Duxbury | 380/4 |

OTHER PUBLICATIONS

Review of TextBridge 2.0 software from Macworld Online at http://macworld.zdnet.com/pages/september.94/Reviews.1177.html, Sep. 1994.

*Primary Examiner*—Bernarr E. Gregory
*Attorney, Agent, or Firm*—David Comarow

[57] ABSTRACT

Disclosed is a software implemented device and method for examining, verifying, correcting and approving electronically-recorded documents, prior to their final output, whether printing, transmission or recording. The disclosed device and method permits the user to assure that the diverse elements of the composite file, such as text, fonts, graphic formats, layout instructions and the like, which may exist in one or more electronic files, will be accessible by, and compatible with the output device. The present embodiment is able to assemble all elements of an electronic file, group of files or an electronic document into one location, whether physical or logical. The present embodiment also allows the above-described analysis on a multiplicity of file types, without need to use the specific file-creation applications used to create the files. This is accomplished by identifying the internal characteristics of the elements of files generated by a multiplicity of file or document creation computer applications and providing a computer software implemented device to decode the information for analysis or presentation. The importance of the present invention lies in its ability to find inconsistencies, incompatibilities, corrupted data and errors not visible to the human checker, to report them or automatically repair them, and, in so doing, to save significant amounts of wasted time and resources in the intermediate or final printing, transmission or recording phase. The present invention allows the user to set custom sets of preferences, establishing unique criteria for the analysis. A further implementation allows the software-implemented device to learn from experience and suggest changes or make changes automatically based on user preferences.

18 Claims, 2 Drawing Sheets

Microfiche Appendix Included
(3 Microfiche, 239 Pages)

DEVICE AND METHOD FOR EXAMINING, VERIFYING, CORRECTING AND APPROVING ELECTRONIC DOCUMENTS PRIOR TO PRINTING, TRANSMISSION OR RECORDING

RELATED U.S. APPLICATION DATA

Continuation of Ser. No. 08/526,554 filed Sep. 12 1995, now abandoned.

BRIEF DESCRIPTION OF APPENDIX

Appendix "A" is a micro fiche copy of all source code comprising the present preferred embodiment invention, and will enable one skilled in the art to implement and understand the invention. Appendix "A" is submitted pursuant to 37 CFR 1.96, and has three sheets of microfiche with a total of 239 text pages.

FIELD OF INVENTION

This invention relates to the field of electronic publishing and specifically to a method of verifying and correcting electronically-recorded documents prior to subsequent printing, transmission or recording.

SUMMARY OF THE INVENTION

This invention describes a device and method of examining electronically-recorded documents (typically in the form of one or more of computer files) prior to printing, transmission or recording, determining their fitness for printing, transmission or recording, and reporting and/or correcting all found inconsistencies and errors to assure compatibility with the printing press, recording apparatus, electronic file server or other output device.

The method involves accepting a file, determining it's origin from the data structure of its contents, such as software program used for its creation, determining structure of the data contained in the file, determining possible data compression and encryption of these data, and reading the file and determining its fitness for being printed, transmitted or recorded.

According to this method, the program automatically generates a report which lists all found inconsistencies and errors in the file which are determined by comparing the data in the file against a set of rules. Such inconsistencies and errors, if ignored may lead to the file being printed incorrectly or not being printed, transmitted or recorded at all by the printing, transmission or recording apparatus.

The device comprises a computer software implemented mechanism in combination with an electronic computer and input and output means to practice the method recited above. The device further incorporates a mechanism for reading and analyzing a multiplicity of file types and formats, outputting the results of the analysis, and gathering into one location the diverse elements of groups of files such as electronic documents. One embodiment interactively or automatically makes corrections in the electronic documents. Another embodiment allows the user to set his or her own preferences or approval criteria. Another embodiment learns from experience and anticipates changes to be made based on user preferences in past sessions.

BACKGROUND OF THE INVENTION

In electronic publishing, complex documents are routinely created utilizing input from a multitude of source data files and software programs, prior to printing, transmitting or recording such documents. A single electronically recorded document may contain a variety of elements, such as text, pictures, formatting codes, font characteristics, etc. In addition, some elements may be present not in their entirety, but as reference pointers to divers locations, be they local, such as a data storage disks, or remote, such as remote network sites. Locations can be of so called 'logical' type or 'physical' type.

For example, in case of 'logical' type of location a portion of a physical storage magnetic disc drive can be designated as a separate storage disc drive and treated by a publishing system accordingly.

An example of a physical storage location would be a removable magnetic diskette, commonly referred to as a "floppy disk."

Document elements can be nested within each other, which further complicates the structure of the overall document.

When one attempts to print, transmit or record such documents, unexpected problems frequently arise.

For instance, an error frequently occurs when one or more document elements are missing during the submission for printing because in the document they are represented as links or pointers only and are somehow unavailable or simply not included in their entirety in the document.

Another type of problem arises when a document is created in a format, or contains settings incompatible with an intended printing engine or transmission or recording apparatus or system.

Yet another set of problems occurs when a file specifies certain fonts and text attributes which were available at the time of document creation, but are not supported by the printing apparatus, or transmission or recording environment. Such situation may arise when a document was created on one computer system but was then transferred for printing to another computer system. Also, frequently problems arise when fonts of different type families, for example, so called 'Type 1' and 'TrueType' are present in the same document.

Print, transmission or recording errors also occur due to a data corruption of the source document which may occur due to a variety of causes, some of which are errors in electronic transmission of documents, copying, compression and decompression, encryption and decryption, and damage to document storage media, to name a few.

Some of the errors and inconsistencies in a document result in incorrect printing, recording or transmission of the documents while other errors and inconsistencies result in a complete failure to print, transmit or record the document.

In view of the above, it would be desirable, therefore, to pre-test documents prior to printing, transmission or recording to uncover any potential printing, transmission or recording problems. In the printing industry this process is commonly referred to as 'pre-press' or 'pre-flight' checking.

The problem of pre-flight checking, though, is not a simple one. The majority of programs that create electronic documents utilize proprietary data formatting and sometimes data encryption which make reading and analysis of created documents difficult and inefficient, if not impossible, without running a computer application program that was originally used to create a document. Moreover, a single document may contain elements created with a multiplicity of document creation software, making pre-flight checking the entire document impossible using the document creation software itself. Additionally, many of the errors or inconsistencies cannot be discovered by simply viewing the document since the document or file may look perfectly normal on the user's display device, but contain incompatible elements with regard to the final printing, transmission or recording process or apparatus. The problems become increasingly complex when dealing with what is commonly referred to as "multi-media" files. These files may contain a variety of elements including text, graphics, sound, moving pictures, "hyper-text," databases, spreadsheets, algorithms, computer code, telecommunications linking programs, among others.

There are several commercial software packages which attempt to alleviate some output problems by providing users with rudimentary tools to examine the document prior to printing. However, these tools have been largely limited to examining only documents created by a 'native' applications (i.e. the applications used to create the file or document) and have been limited to few functions, such as 'missing fonts', missing images', 'unused colors.' QuarkXPress by Quark, Inc. is one example of such a software.

The present invention, on the other hand, provides comprehensive error-checking, utilizing 'learn-by example' technology to automatically create new tests in addition to pre-installed set of tests to be performed on a document to ascertain its printability.

The software tools that do have the capability of reading a document in 'non-native' format in addition to limited scope of documents they can read, lack the pre-print analysis capability of the present invention and are used only to display documents. Adobe Acrobat by Adobe Systems is one such example.

Furthermore, these tools do not provide any suggested remedies to the errors found. The present invention, on the other hand offers an extensive library of possible solutions, as well as a unique artificial intelligence feature, where new potential solutions are created automatically from historical examples by a self-learning feature.

Still other software tools, such as APS-PreFlight by Systems of Merritt Company, provide limited pre-print testing, but only on a so-called PostScript file types, and only regarding print errors which may occur while a file is being printed. This offers little utility to a user, since it only alerts to possible print-time errors while not addressing other errors that might have occurred prior to generation of a print-type file, such as missing or empty document elements. Coupled with lack of suggestions to remedy errors, and failure to show locations of the errors within a document, this seriously hampers usefulness of these tools.

Some software vendors, realizing the importance of keeping document elements together, include a gathering function in their pre-press tools. One such tool is offered as part of QuarkXPress by Quark, Inc. However, the gathering function in this application is greatly limited, for it does not include fonts, dictionaries, and extensions which still have to be manually gathered. This severely impacts usability of the tool, because a user failure to include a single font or other element may result in a serious print error. Unavailable or wrong fonts are among the leading causes of print errors.

The purpose of the present invention, therefore, is to provide an improved method of opening, examining and evaluating electronically-recorded documents, prior to printing.

It is another purpose of this invention to alert the user of potential printing, transmission or recording problems.

It is another purpose of this invention to provide a method to open computer files, particularly documents, created by various software tools, on different computer platforms.

It is yet another purpose of the present invention to provide an improved method to open, examine and evaluate electronically-recorded documents, created by a variety of software applications without actually running these applications.

It is another purpose of this invention to accept and evaluate electronically-recorded documents in compressed or encrypted format.

It is yet another purpose of this invention to enable assembly of all elements of electronically-recorded documents into a single location.

It is yet another purpose of this invention to present suggestions of possible ways to remedy problems found in the electronically-recorded documents.

It is another purpose of this invention to create a list of potential printing, recording or transmission problems found in electronically-recorded documents.

It is yet another purpose of this invention to enable user to select criteria against which the electronically-recorded document's fitness for printing, transmission or recording is checked.

It is another purpose of this invention to automatically create a set of criteria against which the electronically-recorded document's fitness for printing is checked.

It is yet another purpose of this invention to provide a report of all errors and inconsistencies found in the electronically-recorded document in a format selected by the user, which may be made compatible with electronic data exchange structures.

Advantageously, the present invention enables a user to efficiently proof electronically-recorded documents prior to printing, transmission or recording. The process does not require running a software applications program which was used to create the particular electronically-recorded document; rather, the applications' information is gleaned from the files themselves, along with its corresponding attributes. This provides substantial time and cost saving to the pre-press process.

Additionally, the present invention provides a complete check of computer files' elements, in particular, documents' elements, and automatically determines its ability to be printed, recorded or transmitted.

The result of the pre-press, pre-transmission or pre-recording checking and verification process can be displayed for immediate communication to the user. A file containing a list of errors and inconsistencies found in a electronically-recorded document, can also be generated, along with a list of possible steps to remedy them.

In addition, a self-learning feature (also known to those versed in the art as artificial intelligence or expert system) automatically analyzes and stores historical examples of potential print problems and, drawing from the historical analyses, automatically creates suggestions to user as to possible ways to remedy potential printing, recording or transmission problems.

The method of the present invention also provides for an output formatted in specific ways, to further facilitate an exchange of information between all parties involved in production of printed matter, such as customers, service bureaus, and printing establishments, transmission facilities and recording services.

Thus, the present invention offers substantial savings in time and resources to the electronic publishing, transmission and recording industries by providing a comprehensive set of features and performance in a single application.

DETAILED DESCRIPTION OF THE INVENTION

Figure 1:
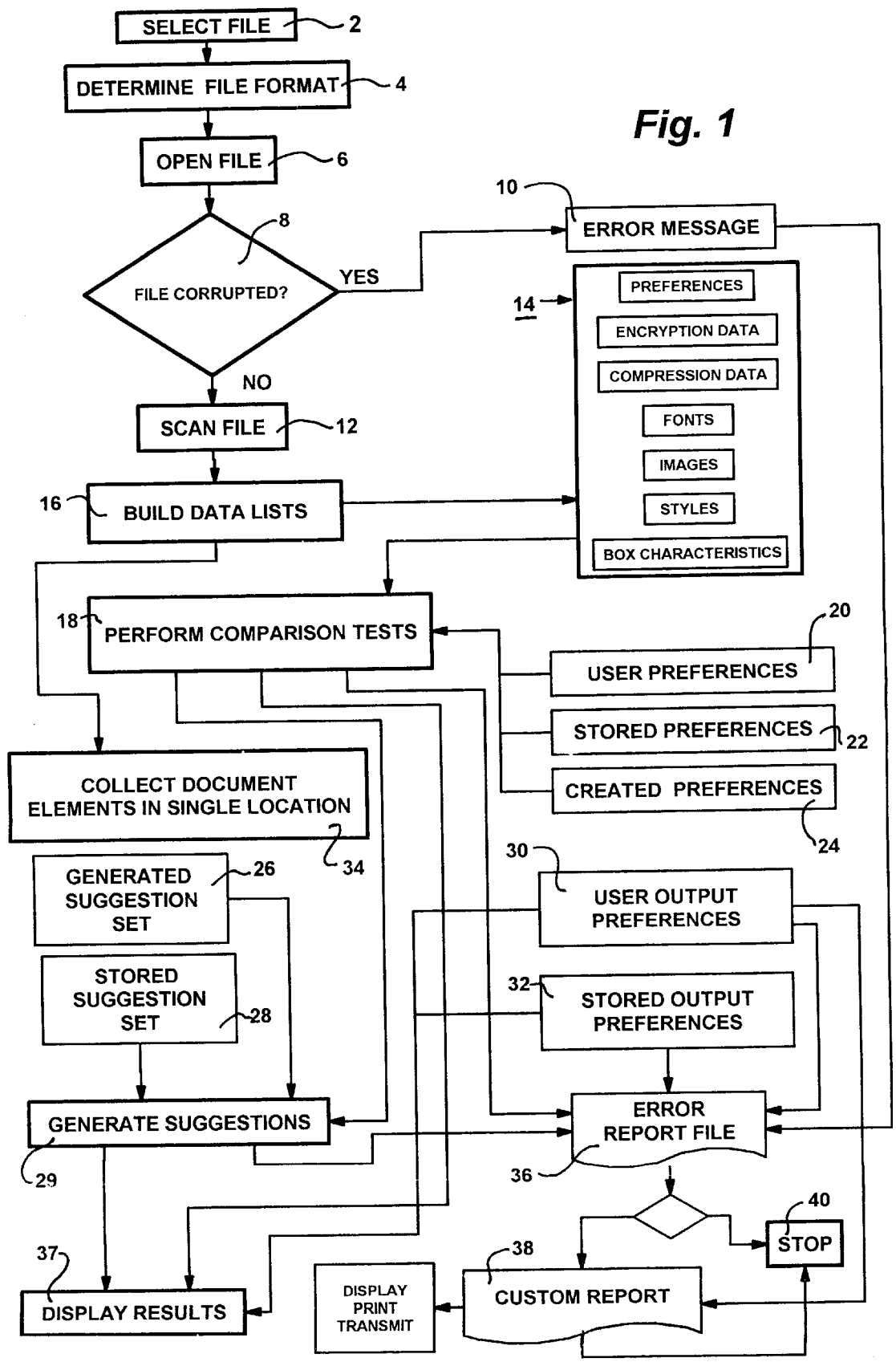
FIG. 1 depicts the flow chart of the method of present invention

In its preferred embodiment the process whose flow chart is shown on FIG. 1 starts with selection of file in step 2. The file format is automatically determined in step 4 by examining the structure and contents of the file which is unique to each computer application used to create the file. If access to the proprietary structure and convention of an application are not available, as is typically the case, the information must be gleaned from the structure of the document file itself 5 and application of general knowledge of the files of this general type. The present embodiment is the result of careful detailed analyses of documents created with various electronic document creation applications, as well as the applications themselves 5a. Such analysis, although laborious, is well known in the art.

The file is then opened in step 6 and checked for corrupted data in step 8 utilizing methods known in the art. For example, computer code used to generate fonts comprises a "resource fork" and a "data fork." Each fork contains information needed to draw the characters on an output device or viewing device. The present invention examines each fork to determine if it contains valid data by comparing the data in the fork with known acceptable values. If file data are corrupted, an error message 10 is generated and entered in the error report file 36, upon which the process stops at step 40. If the file data are found to be intact, the process proceeds to step 12 where the file is scanned for its elements, whose presence or absence is recorded in data lists 14 in step 16. These lists or a list may contain data on document preference settings, encryption, compression, found fonts, images, image attributes and positioning, styles, colors, box characteristics, resolution, link information, embedded objects, among others.

Simultaneously, identified document components are collected in a single location in step 34.

Utilizing user-supplied preferences 20, or a set of pre-loaded preference values 22, comparisons are then performed between these preferences and information contained in the data list in step 18. On demand, the created preferences 24 can be generated automatically utilizing document knowledge database and taking into account information about the document to be analyzed and the data it contains. At the end of the comparison process an error report file 36 is created.

The errors are automatically examined in step 29 and corresponding remedial suggestions are selected from a pre-loaded set 28 residing within a computer system or network. Simultaneously, a knowledge database is searched for presence of the errors and combination of errors of the same type as in error file, and a set of remedial suggestions 26 is generated based on results of the search and on the particular type of error or combination thereof in conjunction with the type of the document and application that created it.

The remedial suggestions are then copied into an error report file and can be simultaneously displayed at user's option. The format of the error report file 36 and display 37 are controlled through format preferences supplied by the user 30, or the ones stored on the system or network 32.

An optional custom report 38 having specific structure containing error data and corresponding remedial suggestions can also be created. Such reports can be used for electronic communication with third parties and automatic information processing of document error data.

Figure 2:
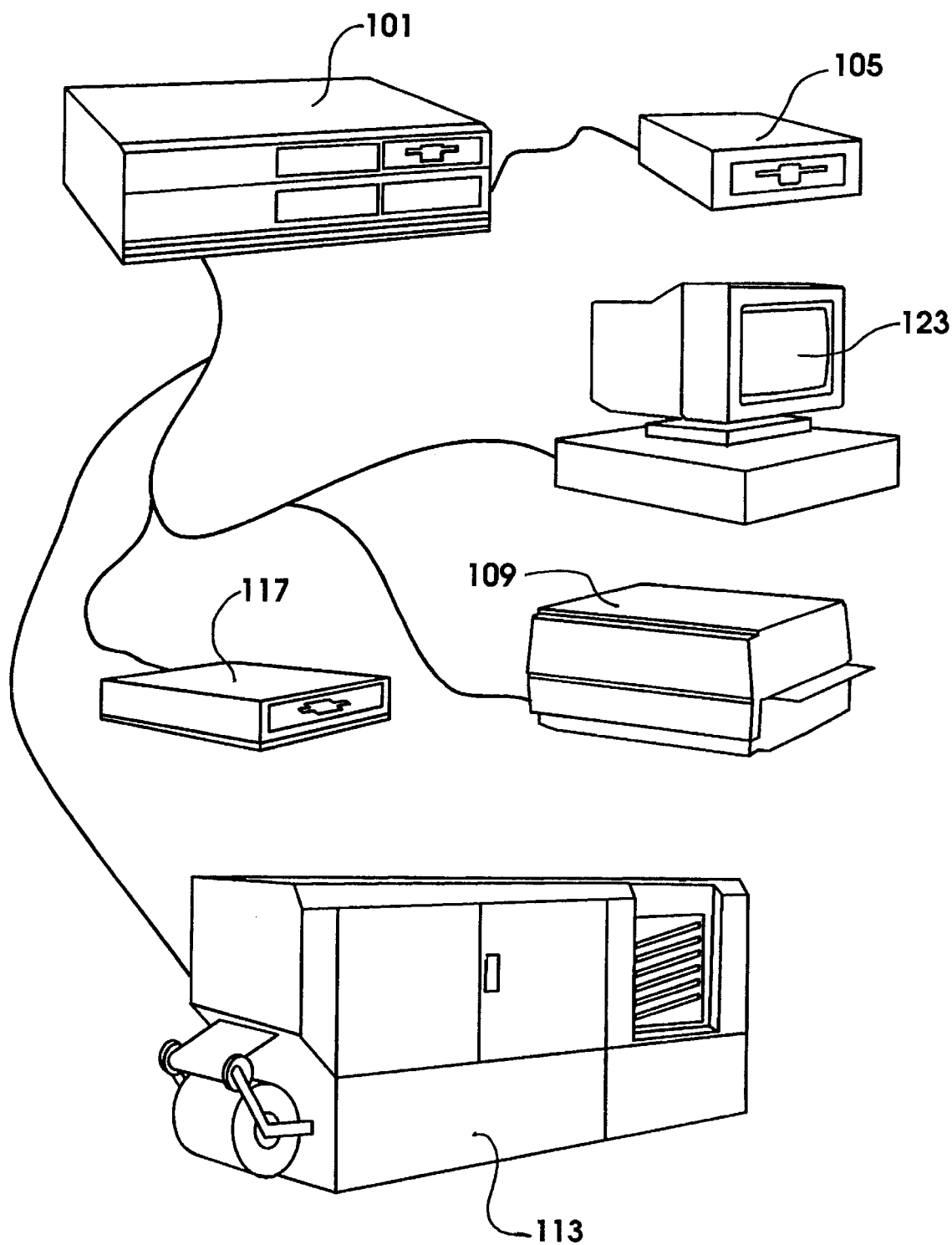
FIG. 2 depicts an electronic computer which functions with software instructions to accomplish the present invention

FIG. 2 shows a digital computer 101 having a means for accepting files 105 and a means for producing reports of incompatibilities with output devices 109 such as a printing press 113, CD Rom recorder 117, electro-optical recording unit 121 or computer network station 123 which would receive electronically transmitted documents.

It should be apparent to the reader that many variations of the present invention are possible without departure from the scope of the present invention. For instance, the sequence of some steps in the process can be altered without the loss of function of the process. The user input of preferences, for example, can be done in a step-by-step fashion as the analysis progresses, or it can be all done at once at the start of the process. The method and device disclosed herein may also be applied to any analogous process where a set of disparate electronic files must be used cooperatively to achieve a final product. Therefor, the field of application is not limited to printing, transmission or recording, but may equally apply to other similarly functioning processes.

Thus, the scope of this invention should be determined by the appended claims and their legal equivalents, rather than by the examples given.

What is claimed is:

1. A system for pre-flight checking electronically-recorded documents to assure compatibility between said electronically-recorded documents and an output printing device, comprising an electronic computer, an input device, an output printing device, a memory device, a set of instructions for said computer, means for said electronic computer for accepting an electronic document file, means for said electronic computer determining the type of said electronic document file, means for setting preferences for said electronically-recorded document font characteristics, means for setting and recording in said memory device preferences for said electronically-recorded document graphic element formats, means for extracting and identifying said document font characteristics from said file, means for extracting and identifying said document graphic element formats from said file, means for comparing said font characteristics in said electronically-recorded document to said preferences set and stored in said memory device, means for storing results of said comparison in said memory device, outputting results of said comparison on said output device, said outputted results comprising indications of inconsistencies between the said preferences set and font characteristics extracted from said electronically-recorded document, said outputted results comprising indications of inconsistencies between the said preferences set and said graphic element formats extracted from said electronically-recorded document.

2. A system as recited in claim 1 wherein said system is capable of accepting an encrypted data file.

3. A system as recited in claim 1 wherein said system evaluates the integrity of the data contained in said data file.

4. A system as recited in claim 1, wherein said outputted results includes suggested changes.

5. A system as recited in claim 4 wherein said suggested changes are obtained from a pre-loaded set residing on said in said computer.

6. A system as recited in claim 4 wherein said suggested changes are created by said system in accordance with pre-set guidelines and accumulation and classification of examples of previous suggestions.

7. A system as recited in claim 4 wherein said electronic document is modified automatically in accordance with the results of said comparison of said set preferences with said font characteristics and said graphic element formats.

8. A system as recited in claim 7 wherein said automatic modification is directed by a set of guidelines recorded in said memory device.

9. A system as recited in claim 1 wherein the format of said outputting of results of said comparison may be set by the user.

10. In electronic document processing, a method for pre-flight checking at least one electronic document intended for printing including the steps of identifying the native format of said electronic document, identifying elements comprising said electronic document, setting preferences for said elements, comparing said identified elements to said pre-defined preferences, generating reports containing results of said comparison, generating reports containing suggestions for remedying inconsistencies between said set preferences and said elements in said electronic document.

11. A method as recited in claim 10 wherein said method includes the step of changing said electronic file according to said suggestions.

12. A method as recited in claim 10 wherein said elements of said document comprise one or more elements from the following list:

application that created document, version of application that created document, document creation information, document compression information, document encryption information, document language, document print information, print effects, printing font substitutions, page size, character attributes, fonts used, text attributes, hyphenation of text, justification of text, relative positions of document components, images present in document, image types, position of images, scaling of images, image nesting, registration marks information, color attributes, color model used, color separation information, color printing information, link information pertaining to other documents and systems, dictionaries, data corruption.

13. A method as recited in claim 10 wherein an intermediate data file is created, said data file containing descriptions of features identified in said electronic document, said descriptions in said data file being compared to descriptions input by user.

14. A method as recited in claim 10 wherein an output data file is created, said output data file containing results of comparison of said elements of said document to preferences supplied by user.

15. A method as recited in claim 10 wherein all components of said document are assembled and recorded in a computer readable medium in a common physical location.

16. A method of claim 10 wherein all components of said document are assembled and recorded in a computer-readable medium in a common logical location.

17. A method as recited in claim 10 wherein said report contains suggestions to remedy potential inconsistencies between said electronic document and said pre-defined preferences.

18. A method as recited in claim 10 wherein said electronic document processing system is capable of accepting and processing said electronic documents in encrypted form.

* * * * *